(12) United States Patent
Kumar et al.

(10) Patent No.: US 12,705,093 B2
(45) Date of Patent: Aug. 11, 2026

(54) HORIZONTALLY SCALABLE SYSTEM FOR MANAGING CONTAINER CLUSTERS

(71) Applicant: Salesforce, Inc., San Francisco, CA (US)

(72) Inventors: Mayank Kumar, San Francisco, CA (US); Xiao Li, Santa Clara, CA (US); Andy Chen, Daly City, CA (US)

(73) Assignee: Salesforce, Inc., San Francisco, CA (US)

( * ) Notice: Subject to any disclaimer, the term of this patent is extended or adjusted under 35 U.S.C. 154(b) by 628 days.

(21) Appl. No.: 18/141,572

(22) Filed: May 1, 2023

(65) Prior Publication Data

US 2024/0370294 A1 Nov. 7, 2024

(51) Int. Cl.

| | |
|---|---|
| ***G06F 9/46*** | (2006.01) |
| ***G06F 9/48*** | (2006.01) |
| ***G06F 9/50*** | (2006.01) |

(52) U.S. Cl.
CPC .......... *G06F 9/4881* (2013.01); *G06F 9/5072* (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 11,616,686 | B1 * | 3/2023 | Chandrachood | G06F 9/5005 709/220 |
| 2023/0060053 | A1 * | 2/2023 | Zhang | G06F 9/5027 |
| 2024/0160425 | A1 * | 5/2024 | Gupta | G06F 9/547 |

* cited by examiner

*Primary Examiner* — Bing Zhao
(74) *Attorney, Agent, or Firm* — Butzel Long

(57) ABSTRACT

Systems, devices, and techniques are disclosed for a horizontally scalable system for managing container clusters. A monolithic management system may perform a first task on a first level of a cloud computing server system. The monolithic management system may perform a second task on a second level of a cloud computing server system. The monolithic management system may invoke instances of a container manager on a level of the cloud computing server system below the second level. The instances of the container manager may update container clusters of the cloud computing server system. The instances of the container manager may be associated with container clusters and the instances of the container manager update their associated container clusters.

20 Claims, 13 Drawing Sheets

Perform Tasks on First Level of Cloud Computing Server System
602

Perform Tasks on Second Level of Cloud Computing Server System
604

Invoke Instances of Container Manager
606

Fig. 4

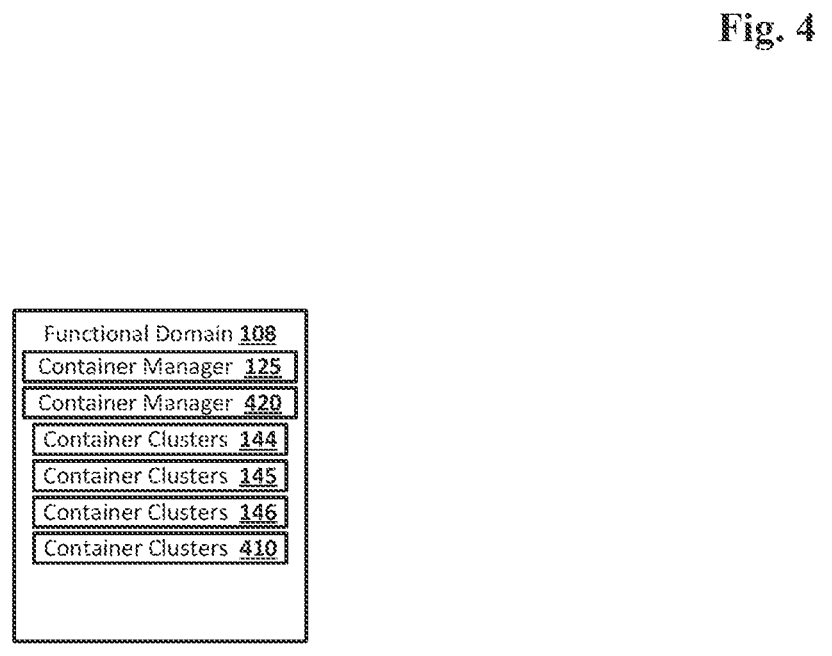

Functional Domain 108

Container Manager 125

Container Manager 420

Container Clusters 144

Container Clusters 145

Container Clusters 146

Container Clusters 410

20
Network Interface 29
Processor 24
Memory 27
I/O Ctrl. 28
Bus 21
Display 22
User Input 26
Fixed Storage 23
Removable Media 25
Central Component 30
Second Computer 31

Client 10
Server 13
Client 11
Network 7
Database 15
Remote Platform 17

HORIZONTALLY SCALABLE SYSTEM FOR MANAGING CONTAINER CLUSTERS

BACKGROUND

A cloud computing server system may host a large number of container clusters. The container clusters may be managed by an entity that may maintain the container clusters on behalf of the users of the container clusters. Maintaining the container clusters by keeping them up to date may be difficult as the number of container clusters increases on the cloud computing server system. Monolithic management systems that may be used by the entity to manage its container clusters on the cloud computing server system may be harder to scale to accommodate the constant addition of new container clusters.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 4 shows an example arrangement suitable for a horizontally scalable system for managing container clusters according to an implementation of the disclosed subject matter.

DETAILED DESCRIPTION

Figure 1:
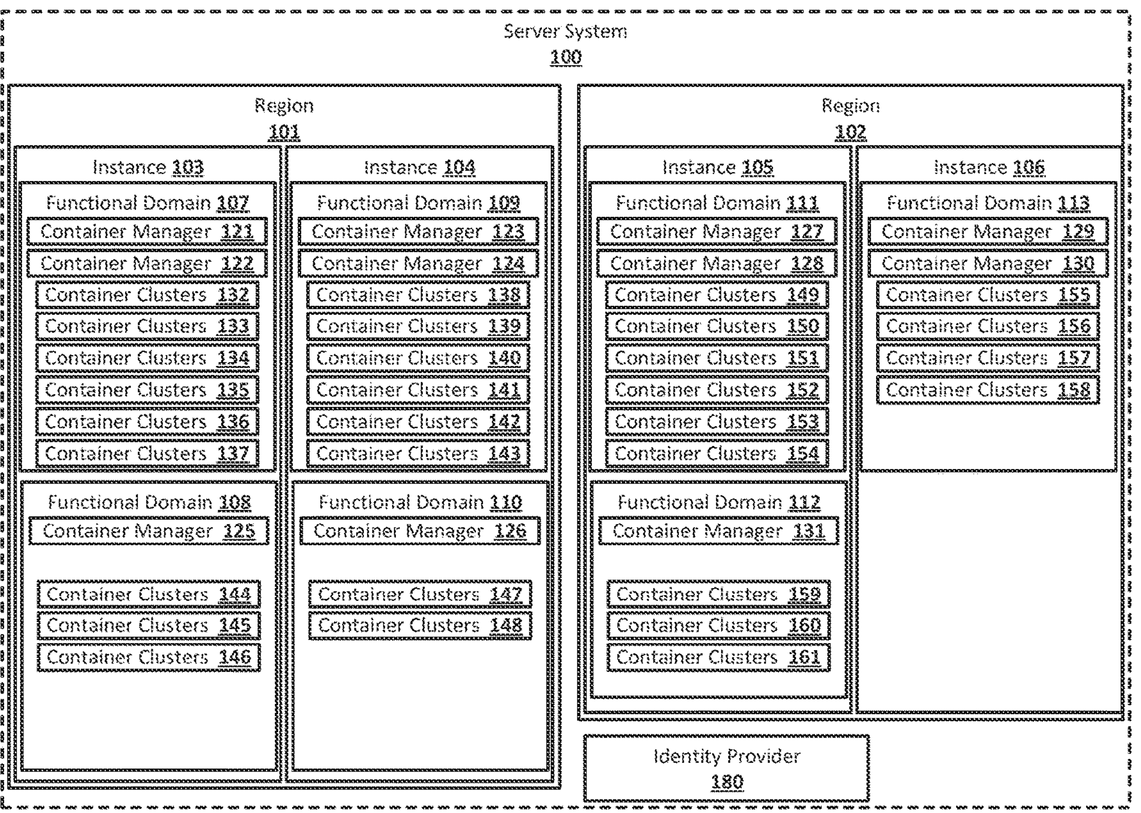
FIG. 1 shows an example system suitable for a horizontally scalable system for managing container clusters according to an implementation of the disclosed subject matter.

Techniques disclosed herein enable a horizontally scalable system for managing container clusters, which may allow for container clusters on a cloud computing server system to be managed efficiently as the number of container clusters to be managed increases. A monolithic management system may perform a first task on the first level of a cloud computing server system. The monolithic management system may perform a second task on a second level of a cloud computing server system. The monolithic management system may invoke instances of a container manager on a level of the cloud computing server system below the second level. The instances of the container manager may update container clusters of the cloud computing server system. Each of the instances of the container manager updates a specified one or more of the container clusters associated with that instance of the container manager. Additional container clusters may be added to the cloud computing server system. Additional instances of the container manager may be added to the cloud computing server system.

A monolithic management system may perform a first task on a first level of a cloud computing server system. A cloud computing server system may be a multi-tenant system that may have any number of tenants. The cloud computing server system may have a hierarchical architecture. For example, the cloud computing server system may include four levels. A top level, or first level, of the cloud computing server system may divide the cloud computing server system into regions. Each region of the cloud computing server system may represent, for example, physical computational resources of the cloud computing server system that may at the same physical location, for example, same building, or may be located at different physical locations within a specified geographic area. For example, a cloud computing server system may have an Eastern US region and Western US region, with the Eastern US region including physical computation resources located at a single or multiple locations in the eastern United States and the Western US region including physical computation resources located at a single or multiple locations in the western United States. Regions may also have specific uses. For example, a cloud computing server system may include a Public Eastern US region, for use by the general public, and a Government Eastern US region, for use by government affiliated entities. The regions of the cloud computing server system may be divided, on a second level, into instances. An instance of a cloud computing server system may include, for example, an application server, a database server, a database, and a search and file system. Instances may be distributed across the physical computational resource of a region of the cloud computing server system in any suitable manner, and a region may include any suitable number of instances. The instances of a region of the cloud computing server system may be divided, on a third level, into functional domains. Functional domains may belong to organizations that are tenants of the cloud computing server system and may be used by tenants to separate data and working environments for different groups of users associated with the tenant. Functional domains may also be referred to as business units. The functional domains of a cloud computing server system may be divided, on a fourth level, or bottom level, into container clusters. The container clusters of a functional domain may include containerized applications that may be used by users of the functional domain. The containerized applications may be any suitable applications that may be capable of running on the cloud computing server system. A container cluster may include any suitable number of containerized applications and may manage running of the containerized applications on the physical computing resources of the cloud computing server system, including managing physical and virtual machines of the cloud computing server system. The bottom level of the hierarchy of the cloud computing server system may be the level that includes the container clusters and there may be any number of levels above the bottom level.

The monolithic management system may be used to perform a task at the first level of the cloud computing server system. For example, the monolithic management system may be used for deployment of container clusters to the cloud computing server system and may perform tasks on the first level, or region-level of the cloud computing server system as part deploying a container cluster. The tasks may include, for example, configuration of the first level of the cloud computing server system or generation of new divisions for the second level, such as generating new instances within a region. The monolithic management system may be operated by an entity is responsible for deploying and managing container clusters on the cloud computing server system. The monolithic management system may be a pipeline-based system that may perform tasks at various level of the cloud computing server system based on pipelines.

The monolithic management system may perform a second task on a second level of a cloud computing server system. For example, the monolithic management system may perform tasks on the second level, or instance level, of the cloud computing server system, including configuration of the instances, or generation of new divisions for the third level, such as generating new functional domain within an instance. The monolithic management system may also perform tasks on any other levels of the hierarchy of the cloud computing server system above the bottom level, including, for example, the third level, or functional domain level.

The monolithic management system may invoke instances of a container manager on a level of the cloud computing server system below the second level. The monolithic management system may, when operating on the level of hierarchy of the cloud computing sever system above the bottom level, invoke an instance of a container manager. The level above the bottom level may be, for example, the functional domain level of the hierarchy of the cloud computing server system. The container manager may be any suitable container management software for managing and updating container clusters, and may be, for example, workflow-based container manager. There may be one instance of the container manager running within a functional domain for every N container clusters in the functional domain, where N may be any number greater than one, and may be the maximum number of container clusters that may be associated with a single instance of the container manager. For example, if N=500, a functional domain that includes 1000 container clusters may include two instances of the container manager, each associated with and responsible for 500 of the container clusters, and each invoked by the monolithic management system at the functional domain level. After being invoked by the monolithic management system, instances of the container manager may run independently of each other and of the monolithic management system, although they may report results back to the monolithic management system.

The instances of the container manager may update container clusters of the cloud computing server system. Each of the instances of the container manager may update specified container clusters associated with that instance of the container manager. An instance of the container manager may be associated with container clusters when the instance of the container manager is added to the cloud computing server system. For example, an instance of a container manager that is added to a functional domain of the cloud computing server system may be associated with up to N container clusters that run on the cloud computing server system as part of that functional domain. After being invoked by the monolithic management system, an instance of the container manager may perform tasks on the container clusters with which the instance of the container manager is associated. The tasks performed by an instance of the container manager on its associated container clusters may include, for example, updating containerized applications within the container clusters, updating the settings and configuration of the container clusters, adding and/or removing containerized applications from the container clusters, and performing any other suitable maintenance on the container clusters. The tasks performed by an instance of the container manager may be specified, for example, in a workflow of the instance of the container manager, which may have been generated in any suitable manner. The instances of the container manager may also perform tasks outside of container clusters, including, for example, provisioning and configuring load balancers, virtual private clouds, networking, and storage for use by the container clusters on the cloud computing server system.

Additional container clusters and additional instances of the container manager may be added to the cloud computing server system. Additional container clusters may be added to the cloud computing server system, for example, at the functional domain level. The additional container clusters may be added in any suitable manner. Container clusters added to a functional domain may be associated with an instance of the container manager that already exists until the number of container clusters associated with that instance of the container manager reaches N, at which point a new instance of the container manager may be added to the functional domain. The new instance of the container manager may be added to the functional domain in any suitable manner, including, for example, being replicated from an existing instance of the container manager in that functional domain. When a new instance of the container manager is added to a functional domain the monolithic management system may be updated as necessary to invoke the additional instance of the container manager, for example, adding a task invoking the new instance of the container manager to the pipeline of the monolithic management system that performs tasks on the functional domain. This may be the only change to the monolithic management system necessary to add the new instance of the container manager, allowing for faster and more efficient horizontal scalability of the update process on the container clusters in the cloud computing server system. The changes to the monolithic management system may be made using metadata to auto-generate pipelines for the monolithic management system that will invoke the newly added instances of the container manager. Because the monolithic management system may only need to invoke instances of the container manager, both container clusters and the instances of the container manager to manage those container clusters can be added to the cloud computing server system while requiring minimal or no changes to the monolithic management system. In particular, the monolithic management system does not need to know about, or be modified to handle, the additional container clusters beyond invoking any additional instances of the container manager. In some implementations the monolithic management system may monitor the loads of the instances of the container manager and dynamically determine which of the several instances of the container manager should responsible for managing particular container clusters.

The instances of the container manager may access their associated container clusters by assuming security roles associated with accounts associated with the container clusters. The container clusters on the cloud computing server system may be associated with accounts on the cloud computing server system. Access to an account associated with a container cluster may be needed to perform operations on the container cluster, including, for example, performing updates and configuration tasks on a container cluster. The instances of the container manager may not be granted direct access to the accounts associated with the container clusters on the cloud computing server system. Instead, each account associated with a container cluster may include a security role generated using identity provider of the cloud computing server system. The identity provider of the cloud computing server system may be a component of the cloud computing server system that allows entities to verify their identity to the cloud computing server system with credentials that may not have been issued by the cloud computing server system itself. The security role generated for an account may be a limited security role that may include a set of permissions that may be limited to allowing only the performance of tasks on container clusters associated with the account that are necessary for updating and maintaining the container clusters. When an instance of the container manager is invoked, it may communicate with the identity provider of the cloud computing server system to assume the limited security roles of the accounts that are associated with the container clusters associated with the instance of the container manager. This may allow an instance of the container manager to obtain the necessary permissions to perform tasks on the container clusters associated with the instance of the container manager even when those container clusters are associated with a number of different accounts on the cloud computing server system, and without allowing the instance of the container manager permissions or access that it should not have. The limited security role may also be, for example, time-limited, so that an instance of the container manager may only use an assumed limited security role for a period of time before needing to re-verify itself to the identity provider.

The instances of the container manager may allow for inner-loop testing to be performed on container clusters outside of the monolithic management system. An instance of the container manager may be directly accessed and modified, for example, having its workflow changed, and invoked outside of the monolithic management system. This may allow for, for example, a developer to implement changes to a container cluster by modifying the workflow of the instance of the container manager associated with that container cluster so that the workflow will implement the desired changes. The instance of the container manager may then be invoked directly, for example, through communication with a computing device outside of the cloud computing server system or through accessing the cloud computing server system through any suitable interface, without waiting for invocation by the monolithic management system, and may follow the modified workflow in updating and managing the container cluster, implementing the desired changes. This may allow for faster implementation of changes to container clusters and faster iteration on testing, for example, when developers are testing their changes to the workflows or developing new workflows and testing them in a development environment, as changes may be made to container clusters by the instance of the container manager without having to wait for the monolithic management system to reach the end of its pipeline and invoke the instance of the container manager after performing tasks on higher level of the cloud computing server system hierarchy.

FIG. 1 shows an example system suitable for a horizontally scalable system for managing container clusters according to an implementation of the disclosed subject matter. A server system 100 may be, for example, a cloud computing server system that may include computing devices that may be, for example, the computer 20 as described in FIG. 9, or components thereof. The server system 100 may include any number computing devices, each of which may include any suitable combination of central processing units (CPUs), graphical processing units (GPUs), and tensor processing units (TPUs). The server system 100 may be distributed over any geographic area, and may, for example, include geographically disparate computing devices connected through any suitable network connections.

The server system 100 may be divided into region 101 and region 102. The region 101 and region 102 may be separate regions of the server system 100 that may each include physical computational resources that may be separate from each other, for example, located in geographically disparate locations, and may be connected to each other through any suitable form of network connection. For example, the region 101 may include physical computational resources that are located in a number of physical locations with physical computational resources in the eastern portion of the United States, while the region 102 may include a number of physical locations with physical computational resources in the western portion of the United States. The server system 100 may include any number of regions, and the physical computational resources of the server system 100 may be apportioned among the regions in any suitable manner. The regions may the top-level of the hierarchy of the server system 100.

The region 101 and the region 102 may be each host any number of instances. For example, the region 101 may host the instance 103 and the instance 104, and the region 102 may host the instance 105 and the instance 106. The instances 103, 104, 105, and 106 may include for example, an application server, a database server, a database, and a search and file system, which may use the physical computational resources of the instances respective region. The instances 103 and 104 may, for example, use the physical computation resources of the region 101 to implement their respective application servers, database servers, databases, and search and file systems.

The instances 103, 104, 105, and 106 may each include any number of functional domains. For example, the instance 103 may include the functional domains 107 and 08, the instance 104 may include the functional domains 109 and 110, the instance 105 may include the functional domains 111 and 112, and the instance 106 may include the functional domain 113. Functional domains, such as the functional domains 107, 108, 109, 110, 111, 112, and 113, may be optional on the server system 100, and may be used, for example, to divide up access to the instances of the server system 100 among tenants of the server system 100, with each functional domain being assigned to single tenant, and a single tenant having any number of functional domains.

The functional domains 107, 108, 109, 110, 111, 112, and 113 may each host any number of container clusters and any number of instances of the container manager. For example, the functional domain 107 may host container clusters 132, 133, 134, 135, 136, and 137, and instances of the container manager 121 and 122, the functional domain 108 may host container clusters 144, 145, and 16, and instance of the container manager 125, the functional domain 109 may host container clusters 138, 139, 140, 141, 142, and 143, and instances of the container manager 123 and 124, the functional domain 110 may host container clusters 147 and 148, and instance of the container manager 126, the functional domain 111 may host container clusters 149, 150, 151, 152, 153, and 154, and instances of the container manager 127 and 128, the functional domain 112 may host container clusters 159, 160, and 161, and instance of the container manager 131 and the functional domain 113 may host container clusters 155, 156, 157, and 158, and instances of the container manager 129 and 130. The container clusters 132-161 may include any number of container clusters, for example, with each including 1000 container clusters. The instances of the container manager 121-131 may each be an instance of the same container manager, which may be workflow based, with instances of the container manager responsible for updating and maintaining some portion of the container clusters that are part of the same functional domain as the instance of the container manager. For example, the instance of the container manager 121 may be responsible for updating and maintaining container clusters that are included in the container clusters 132-134, the instance of the container manager 122 may be responsible for updating and maintaining container clusters that are included in the container clusters 135-137, and the container manager 125 may be responsible for updating and maintaining container clusters that are included in the container clusters 144-146.

The server system 100 may include an identity provider 180. The identity provider 180 may be a service of the server system 100 that may verify identities of users attempting to access the server system 100. The identity provider 180 may be implemented using any physical computational resources of the server system 100, and may, for example, not be specific to the region 101 or the region 102. The identity provider 180 may manage accounts and their associated security roles that may be used to access resources of the server system 100, including any of the container clusters in the regions 101 and 102.

Figure 2A:
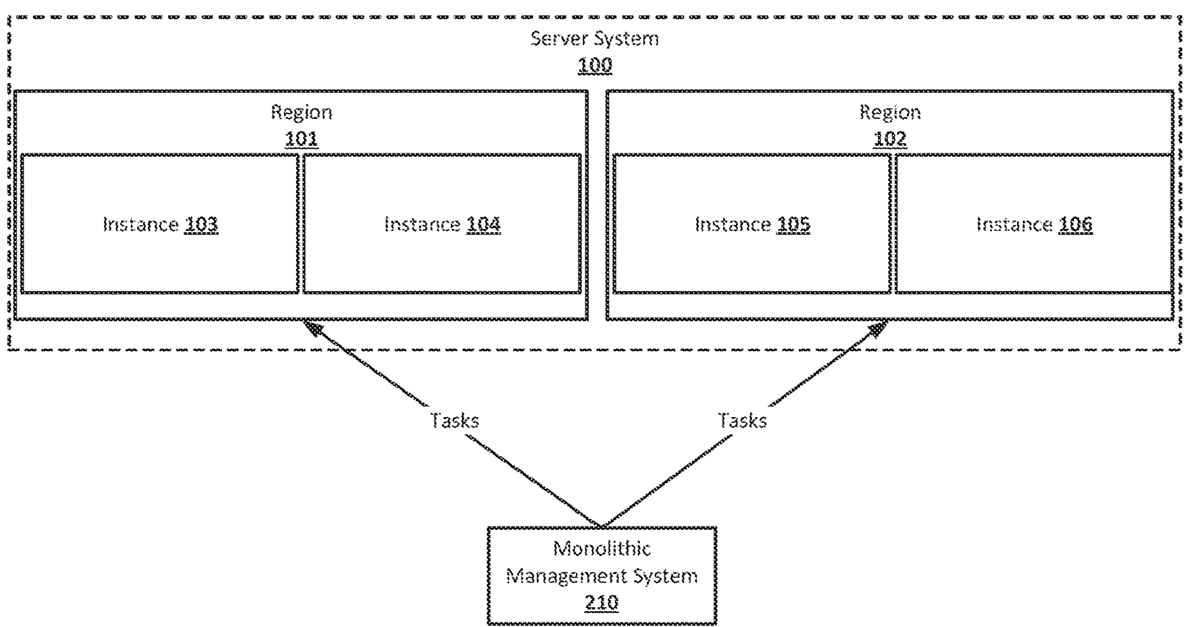
FIG. 2A shows an example arrangement suitable for a horizontally scalable system for managing container clusters according to an implementation of the disclosed subject matter.

FIG. 2A shows an example arrangement suitable for a horizontally scalable system for managing container clusters according to an implementation of the disclosed subject matter. A monolithic management system 210 may be used by an entity to manage its presence on the server system 100. The monolithic management system 210 may be a pipeline-based management system and may be run on any suitable computing device. For example, the monolithic management system 210 may run on a computing device that is not part of the server system 100 or may run on physical computational resources of the server system 100, for example, in the instance 103 of the region 101.

The monolithic management system 210 may perform tasks on the region 101 and the region 102 of the server system 100. For example, the entity that uses the monolithic management system 210 may be responsible for container clusters that are part of instances on both the region 101 and region 102. The tasks performed by the monolithic management system 210 on the regions 101 and 102 may include, for example, configuration of the regions 101 and 102 of the server system 100 or generation of new instances within the regions 101 and 102. The monolithic management system 210 may perform tasks on the regions 101 and 102 in any suitable order or may be able to operate on both regions in parallel. In some implementations, the monolithic management system 210 may perform all tasks on every level of a region before performing any tasks on another region.

Figure 2B:
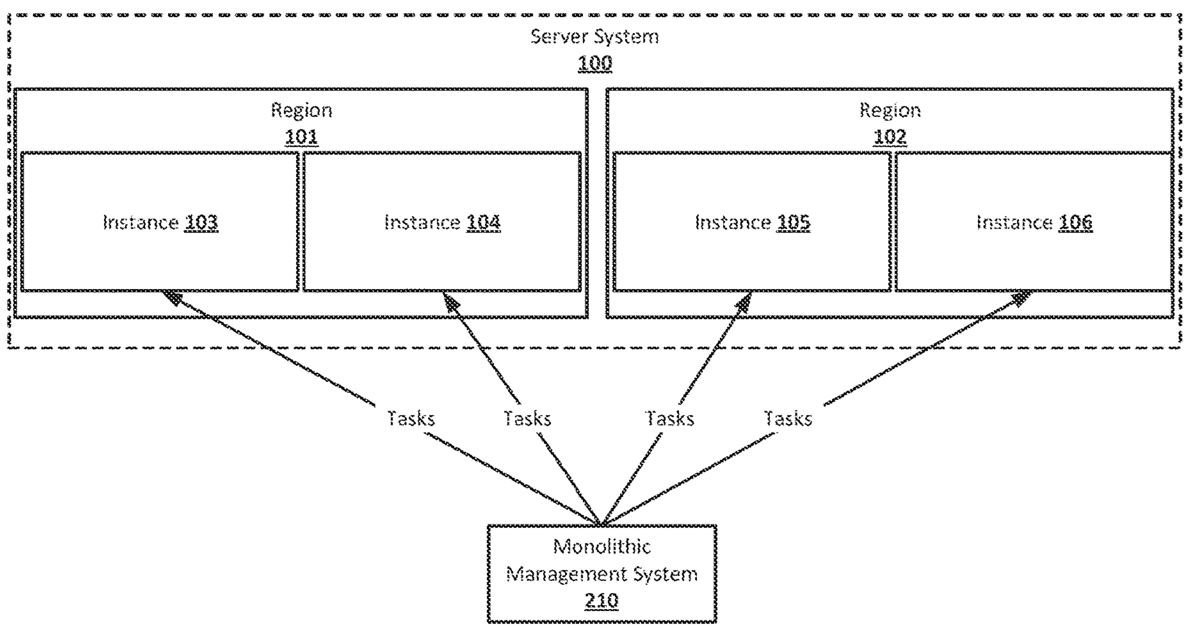
FIG. 2B shows an example arrangement suitable for a horizontally scalable system for managing container clusters according to an implementation of the disclosed subject matter.

FIG. 2B shows an example arrangement suitable for a horizontally scalable system for managing container clusters according to an implementation of the disclosed subject matter. After completing tasks on the region 101, the monolithic management system 210 may perform tasks on the instances 103 and 104, and after completing tasks on the region 102, the monolithic management system may perform tasks on the instances 105 and 106. The tasks performed by the monolithic management system 210 on the instances 103, 104, 105, and 106 may include, for example, configuration of the instances, or generation of new divisions of the instances, such as generating new functional domain within an instance. The monolithic management system 210 may perform tasks on the instances 103, 104, 105, and 106 in any suitable order as encoded by the workflows or may be able to operate on instances in parallel.

Figure 2C:
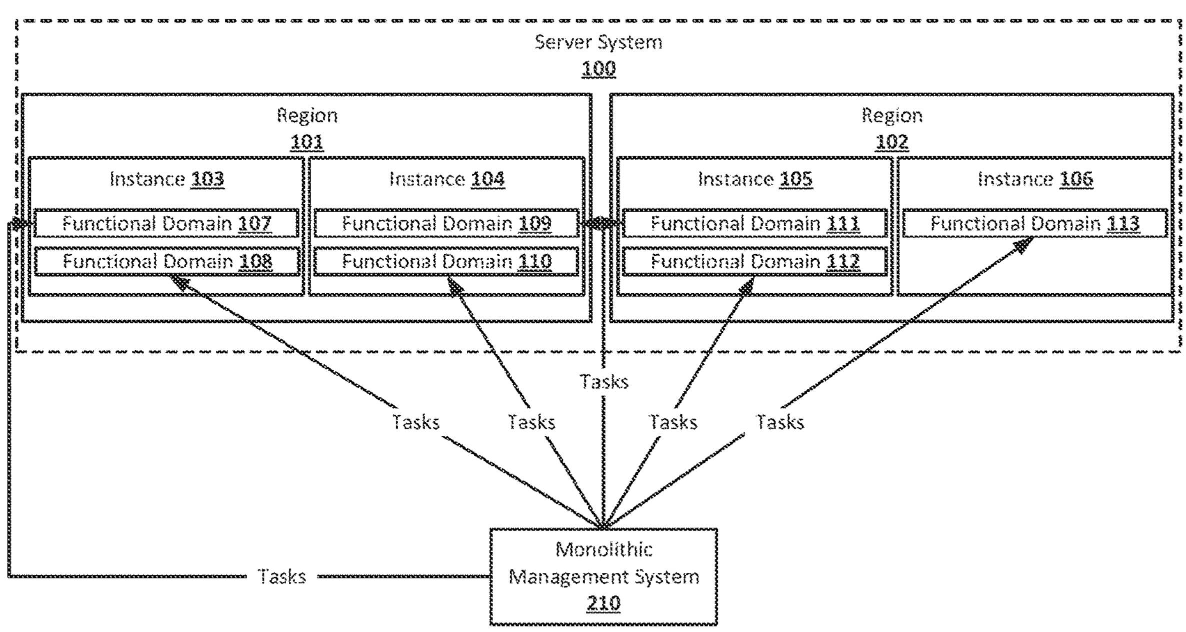
FIG. 2C shows an example arrangement suitable for a horizontally scalable system for managing container clusters according to an implementation of the disclosed subject matter.

FIG. 2C shows an example arrangement suitable for a horizontally scalable system for managing container clusters according to an implementation of the disclosed subject matter. After completing tasks on the instance 103, the monolithic management system 210 may perform tasks on the functional domains 107 and 108, after completing tasks on the instance 104, the monolithic management system 210 may perform tasks on the functional domains 109 and 110, after completing tasks on the instance 105, the monolithic management system 210 may perform tasks on the functional domains 111 and 112, and after completing tasks on the instance 106, the monolithic management system 210 may perform tasks on the functional domain 113. The monolithic management system 210 may perform tasks on the instances functional domains 107, 108, 109, 110, 11, 112, and 113 in any suitable order or may be able to operate on instances in parallel.

Figure 2D:
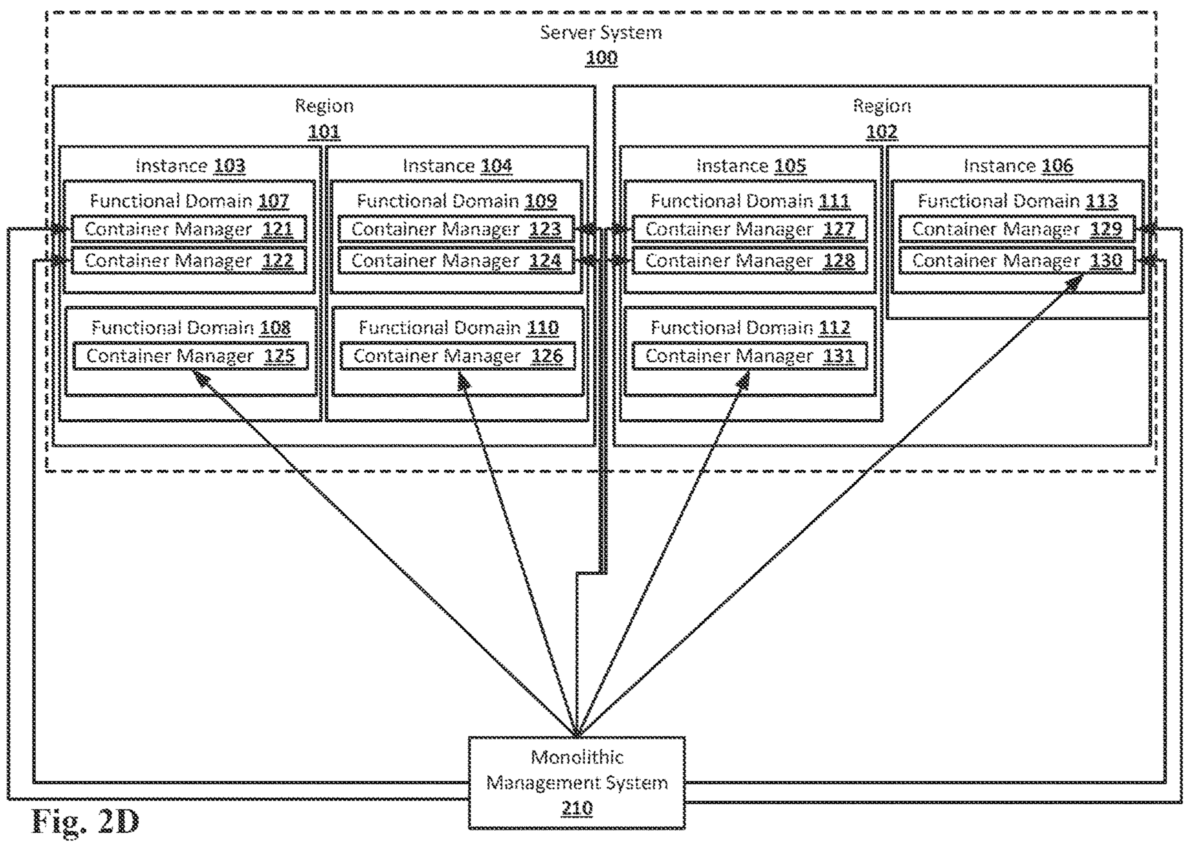
FIG. 2D shows an example arrangement suitable for a horizontally scalable system for managing container clusters according to an implementation of the disclosed subject matter.

FIG. 2D shows an example arrangement suitable for a horizontally scalable system for managing container clusters according to an implementation of the disclosed subject matter. After completing tasks on the functional domain 107, the monolith management system 210 may invoke the instances of the container manager 121 and 122 that are responsible for managing the container clusters 132-137 of the functional domain 107. The monolithic management system 210 may not perform any tasks on the container clusters 132-137 itself, as invoking the instances of the container manager 121 and 122 may be the last task the monolithic management system 210 performs on the path through the hierarchy of the server system 100 that ends with the container clusters 132-137 since the actual configuration on container clusters 132-137 is delegated to the container manager 121 and 122 respectively, hence providing horizontal scalability as the number of container clusters increase. The monolithic management system 210 may similarly invoke the instances of the container manager 123 and 124 after completing tasks on the functional domain 109, the instance of the container manager 125 after completing tasks on the functional domain 108, the instance of the container manager 126 after completing tasks on the functional domain 110, the instances of the container manager 127 and 128 after completing tasks on the functional domain 111, the instance of the container manager 131 after completing tasks on the functional domain 112, and the instances of the container manager 129 and 130 after completing tasks on the functional domain 113.

Figure 3A:
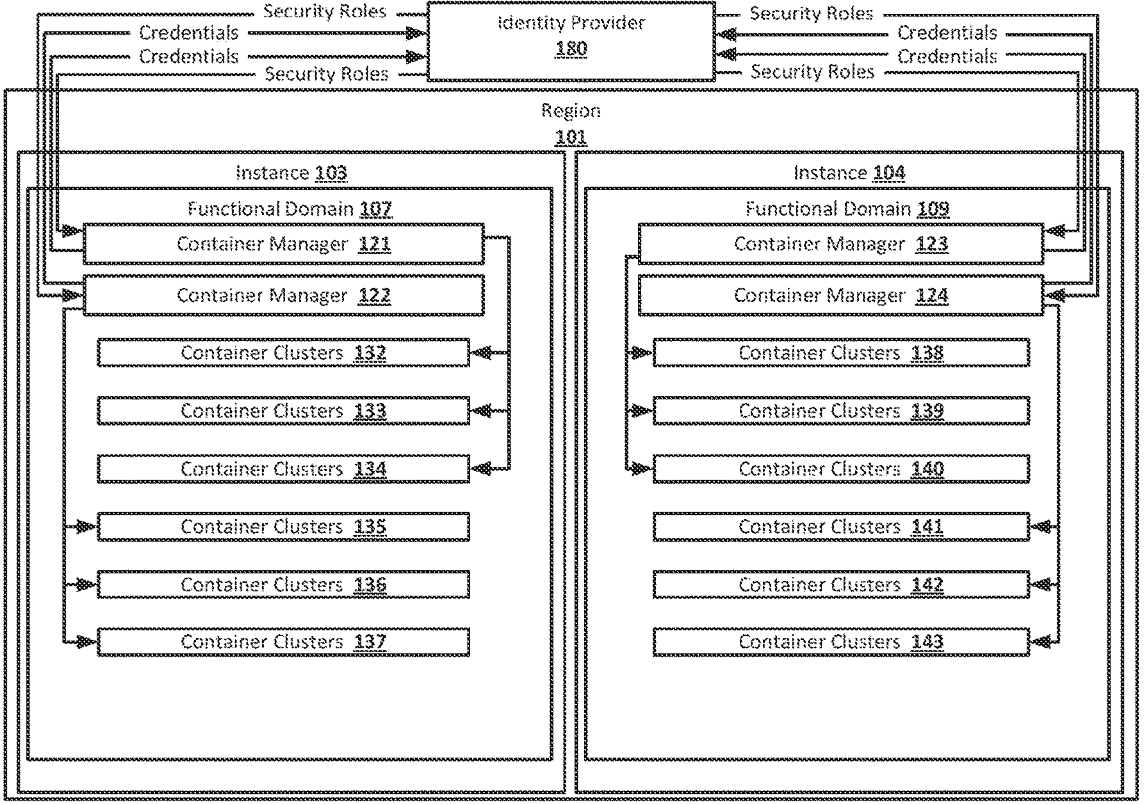
FIG. 3A shows an example arrangement suitable for a horizontally scalable system for managing container clusters according to an implementation of the disclosed subject matter.

FIG. 3A shows an example arrangement suitable for a horizontally scalable system for managing container clusters according to an implementation of the disclosed subject matter. After being invoked by the monolithic management system 210, the instances of the container manager 121, 122, 123, and 124 may present respective credentials to the identity provider 180 to identify and authenticate themselves. The identity provider 180 may, after verifying the credentials presented by the instances of the container manager 121, 122, 123, and 124, provide access to the security roles that the instances of the container manager 121, 122, 123, and 124 are authorized to assume, for example, security roles that are associated with accounts associated with the container clusters associated with the instances of the container manager 121, 122, 123, and 124. For example, the instance of the container manager 121 may be permitted by the identity provider 180 to assume security roles associated with accounts associated with container clusters of the container clusters 132, 133, and 134. The security roles assumed by the instance of the container manager 121 may be limited security roles that may include only the permissions needed by the instance of the container manager 121 to update and maintain the container clusters of the container clusters 132, 133, and 134. The security roles may also be time limited, so that they may only be assumed for a specified period of time by an instance of a container manager before requiring that the container manager have its credentials re-verified by the identity provider 180.

After being permitted to assume the security roles associated with the accounts associated with the container clusters that they manage, the instances of the container manager 121, 122, 123, and 124 may perform tasks on their associated container clusters of the container clusters 132-143 and tasks outside of the container clusters. For example, the instance of the container manager 121 may perform tasks on the container clusters of the container clusters 132, 133, and 134 including updating containerized applications within a container clusters, updating the settings and configuration of the container clusters, adding and/or removing containerized applications from the container clusters, and performing any other suitable maintenance on the container clusters. The tasks performed by the instance of the container manager 121 may be specified, for example, in a workflow of the instance of the container manager 121, which may have been generated in any suitable manner and may include tasks for all of the container clusters of the container clusters 132, 133, and 134. The instance of the container manager 121 may also perform tasks outside of the container clusters, including, for example, provisioning and configuring load balancers, virtual private clouds, networking, and storage for use by the container clusters of the container clusters 132, 133, and 134 on the server system 100.

Figure 3B:
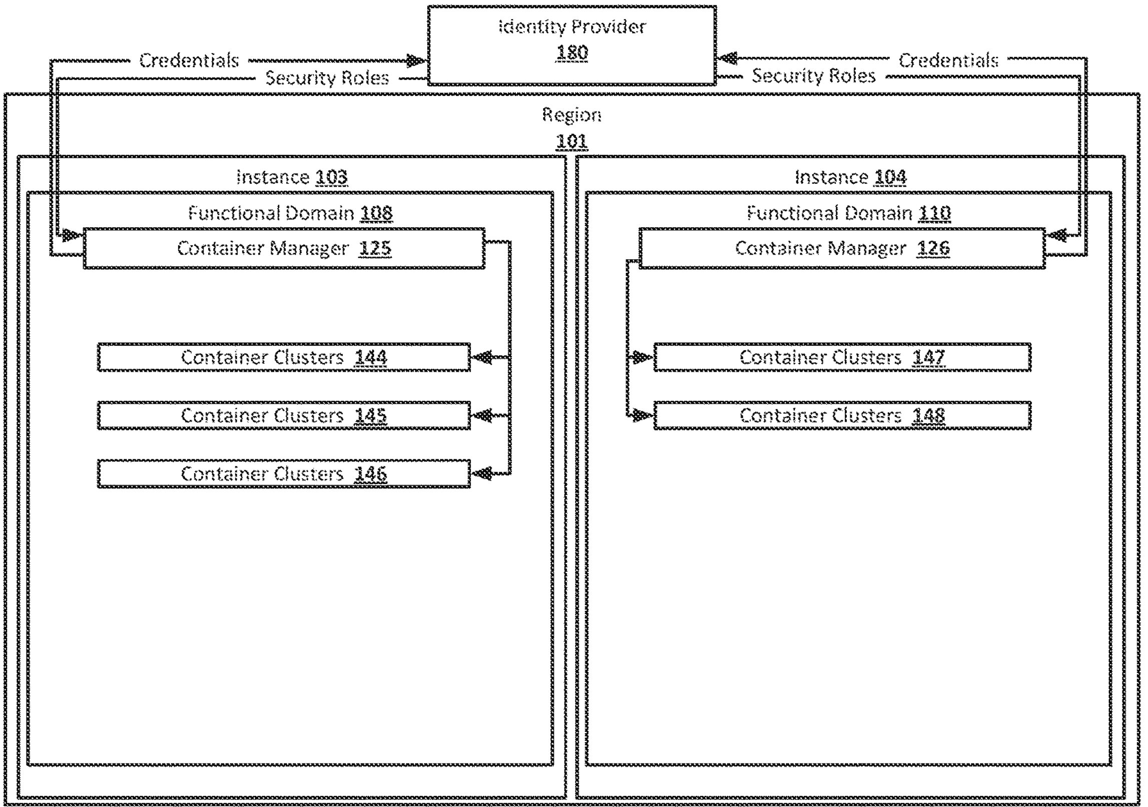
FIG. 3B shows an example arrangement suitable for a horizontally scalable system for managing container clusters according to an implementation of the disclosed subject matter.

FIG. 3B shows an example arrangement suitable for a horizontally scalable system for managing container clusters according to an implementation of the disclosed subject matter. Similarly, after being invoked by the monolithic management system 210, the instances of the container manager 125 and 126 may present respective credentials to the identity provider 180 to identify and authenticate themselves. The identity provider 180 may, after verifying the credentials presented by the instances of the container manager 125 and 126, provide access to the security roles that the instances of the container manager 125 and 126 are authorized to assume, which may be limited security roles that may also be time limited. After being permitted to assume the security roles associated with the accounts associated with the container clusters that they manage, the instances of the container manager 125 and 126 may perform tasks on their associated container clusters of the container clusters 144-148 and tasks outside of the container clusters.

FIG. 4 shows an example arrangement suitable for a horizontally scalable system for managing container clusters according to an implementation of the disclosed subject matter. Additional container clusters 410 may be added to the functional domain 108. The container clusters 410 may be added to the functional domain 108 in any suitable manner, including, for example, through tasks performed by the monolithic management system 210 on the functional domain 108. A new instance of the container manager 420 may be added to the functional domain 108 to be responsible for the container clusters of the container clusters 410. For example, individual instances of the container manager on the server system 100 may be responsible for up to 3000 container clusters, and the container clusters 144, 145, and 146 may each include 1000 container clusters. The addition of the container clusters 410 to the functional domain 108 may result in the number of container clusters in the functional domain 108 exceeding 3000, so the instance of the container manager 420 may be added to the functional domain 108 to be responsible for the container clusters beyond the 3000 for which the instance of the container manager 125 is responsible. The new instance of the container manager 420 may be added in any suitable manner. For example, the new instance of the container manager 420 may be added by a task of the monolithic management system 210. The instance of the container manager 410 may be added through installation, or through replication of another instance of the container manager, such as the instance of the container manager 125. Adding the instance of the container manager 420 may be more efficient than modifying the tasks of the monolithic management system 210 to handle the container clusters of the container clusters 410, as the only modification made to the monolithic management system 210 may be the addition of a task to invoke the instance of the container manager 420. Appropriate security rules may be added to the identity provider 180 so that the container manager 420 may assume these security rules to manage and update the container clusters of the container clusters 410.

Figure 5:
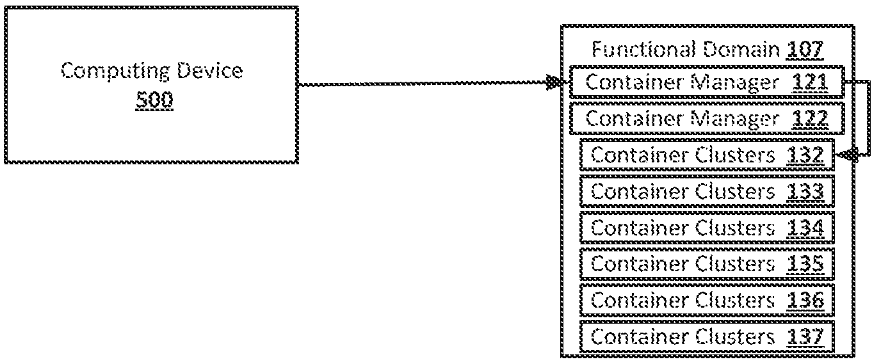
FIG. 5 shows an example arrangement suitable for a horizontally scalable system for managing container clusters according to an implementation of the disclosed subject matter.

FIG. 5 shows an example arrangement suitable for a horizontally scalable system for managing container clusters according to an implementation of the disclosed subject matter. A computing device 500 may be any suitable computing device, such as, for example, a computer 20 as described in FIG. 9, or component thereof, for package for configuring a working environment on a server instance. The computing device 500 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 500 may be part of a computing system and network infrastructure or may be otherwise connected to the computing system and network infrastructure, including a larger server network which may include other server systems similar to the computing device 500. The computing device 500 may include any suitable combination of central processing units (CPUs), graphical processing units (GPUs), and tensor processing units (TPUs).

The computing device 500 may be used to initiate inner-loop on container clusters, for example, in development environments. For example, the computing device 500 may be used to access and directly invoke the instance of the container manager 121 outside of the monolithic management system 210. The computing device 500 may invoke the instance of the container manager 121 to cause the instance of the container manager 121 to perform tasks, such as updating containerized applications, for specified container clusters of the container clusters 132. The computing device 500 may be used by, for example, developers who wish to test updated versions of the containerized applications. Using the computing device 500 to invoke the container manager 121 may allow for such testing to be performed more rapidly than both if the monolithic management system 210 were responsible for managing container clusters and waiting for the monolithic management system 210 to invoke the container manager 121.

Figure 6:
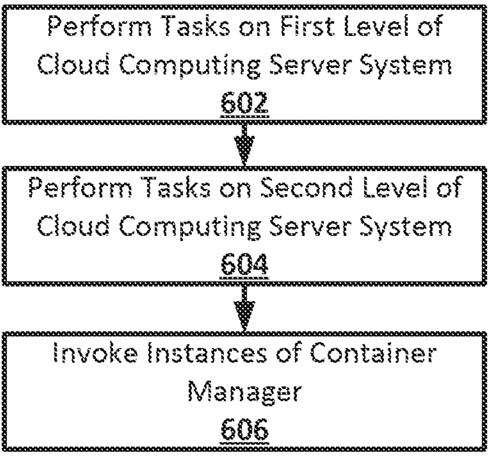
FIG. 6 shows an example procedure suitable for a horizontally scalable system for managing container clusters according to an implementation of the disclosed subject matter.

FIG. 6 shows an example procedure suitable for a horizontally scalable system for managing container clusters according to an implementation of the disclosed subject matter. At 602, tasks may be performed on the first level of a cloud computing server system. For example, the monolithic management system 210 may, upon starting to perform tasks from a workflow or pipeline, begin by performing tasks on the regions 101 and 102 of the server system 100, including, for example, configuration of the regions 101 and 102 of the server system 100 or generation of new instances. The tasks performed on the first level of the cloud computing server system may be performed in parallel, or tasks may be performed on the hierarchy of the cloud computing server system in a depth-first manner or based on any other suitable traversal pattern may start at the first level of the cloud computing server system.

At 604, tasks may be performed on a second level of the cloud computing server system. For example, the monolithic management system 210 may perform tasks on the instances 103, 104, 105, and 106 of the regions 101 and 102 of the server system 100, including, for example, configuration of the instances, or generation of new divisions of the instances, such as generating new functional domain within an instance. The tasks performed on the second level of the cloud computing server system may be performed in parallel, or tasks may be performed on the hierarchy of the cloud computing server system in a depth-first manner or based on any other suitable traversal pattern that may start at the first level of the cloud computing server system.

At 606, instances of a container manager may be invoked. For example, the monolithic management system 210, after completing tasks on the functional 107, may invoke the instances of the container manager 121 and 122. Invoking the instances of the container manager 121 and 122 may cause them to start running on the server system 100 and perform tasks as prescribed by any workflows associated with the instances of the container manager 121 and 122, such as managing and updating the container clusters 132-137. Once the monolithic management system 210 has invoked the instances of the container manager 121 and 122, the monolithic management system 210 may have completed tasks on the path through the hierarchy of the server system 100 that leads to the functional domain 107. The monolithic management system 210 may similarly invoke instances of the container manager that are part of any functional domain on which the monolithic management system has completed performing tasks in its pipeline or workflow. In implementations, the number of levels in the hierarchy of the server system 100 may vary. For example, the server system 100 may not include functional domains as divisions of instances, in which case the monolithic management system 210 may invoke the instances of the container manager 121 and 122 once it has completed performing tasks on the instance 103. If the server system 100 includes additional levels below functional domains, the monolithic management system 210 may only invoke the instances of the container manager 121 and 122 after it has completed tasks on the level directly above the level of the instances of the container manager 121 and 122.

Figure 7:
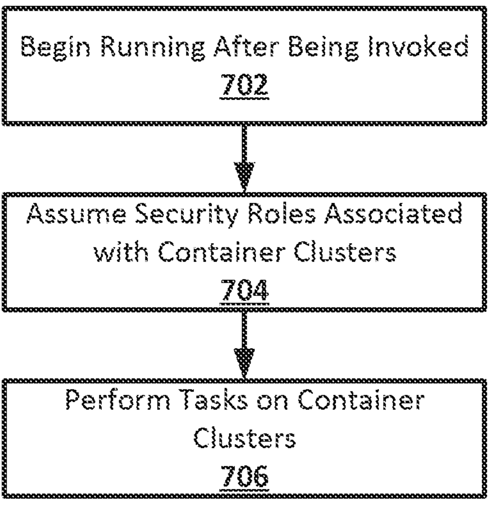
FIG. 7 shows an example procedure suitable for a horizontally scalable system for managing container clusters according to an implementation of the disclosed subject matter.

FIG. 7 shows an example procedure suitable for a horizontally scalable system for managing container clusters according to an implementation of the disclosed subject matter. At 702, an instance of a container manager may begin running after being invoked. For example, the instance of the container manager 121 may begin running on the instance 103 of the server system 100 after being invoked by either the monolithic management system 210 or by the computing device 500.

At 704, the instance of the container manager may assume security roles associated with container clusters. For example, the container clusters of the container clusters 132, 133, and 134 may be associated with accounts that have associated security roles managed by the identity provider 180. The security roles associated with the container clusters may be roles that are part of accounts of the server system 100 to whom the container clusters belong, and may permit access to the container clusters to allow for updating and management of the container clusters and for the performance of other tasks that may be related to maintaining and running container clusters. The security roles may have limited access and may also be time limited. The instance of the container manager 121, after being invoked, may present credentials to verify its identity to the identity provider 180 and request to assume security roles associated with the container clusters of the container clusters 132, 133, and 134. The identity provider 180, upon verifying the identity of the instance of the container manager 121, may permit the instance of the container manager 121 to assume the requested security roles associated with the container clusters of the container clusters 132, 133, and 134.

At 706, the instance of the container manager may perform tasks on container clusters. For example, the instance of the container manager 121, after assuming the security roles associated with the container clusters of the container clusters 132, 133, and 134, may use the permissions of the security roles to access and perform tasks on the container clusters of the container clusters 132, 133, and 134. The tasks performed by the instance of the container manager 121 may include, for example, updating containerized applications within the container clusters, updating the settings and configuration of the container clusters, adding and/or removing containerized applications from the container clusters, and performing any other suitable maintenance on the container clusters. The instance of the container manager 121 may also perform tasks outside of the container clusters, including, for example, provisioning and configuring load balancers, virtual private clouds, networking, and storage for use by the container clusters of the container clusters 132, 133, and 134 on the server system 100.

Figure 8:
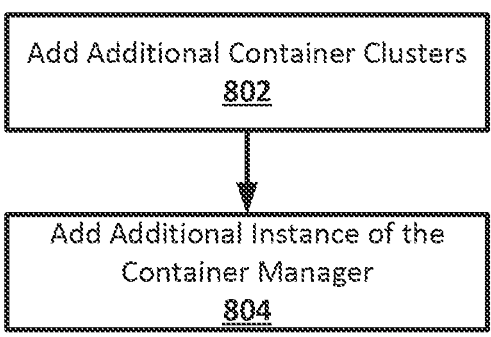
FIG. 8 shows an example procedure suitable for a horizontally scalable system for managing container clusters according to an implementation of the disclosed subject matter.

FIG. 8 shows an example procedure suitable for a horizontally scalable system for managing container clusters according to an implementation of the disclosed subject matter. At 802, additional container clusters may be added. For example, a number of container clusters may be added to the functional domain 107 as part of the of the container clusters 410. The additional container clusters may be added in any suitable manner and by any suitable component of, or in communication with, the server system 100, including, for example, the monolithic management system 210. New security roles for the added container clusters of the container clusters 410 may be added to the server system 100 and managed by the identity provider 180. The new security roles may have limited access and may be time limited.

At 804, an additional instance of the container manager may be added. For example, the instance of the container manager 420 may be added to the functional domain 107 to be responsible for the added container clusters of the container clusters 410. The instance of the container manager 420 may be added to the functional domain 107 in any suitable manner, including, for example, being replicated from the instance of the container manager 125 and modified based on the tasks that will need to be performed on and for the added container clusters of the container clusters 410. The instance of the container manager 420 may be associated with the security roles added for the container clusters of the container clusters 410 so that the instance of the container manager 420 may assume those security roles. The monolithic management system 210 may also have a task added to the end of its workflow or pipeline that invokes the instance of the container manager 420, though in some implementations that monolithic management system 210 may perform a task that invokes all available instances of the container manager, and may thus not need modification to account for the addition or removal of instances of the container manager from the server system 100. This may allow for efficient horizontal scalability of container clusters on the server system, as new instances of the container manager may be quickly added to be responsible for new container clusters with no or minimal modifications to the workflows or pipelines of the monolithic management system 210.

Figure 9:
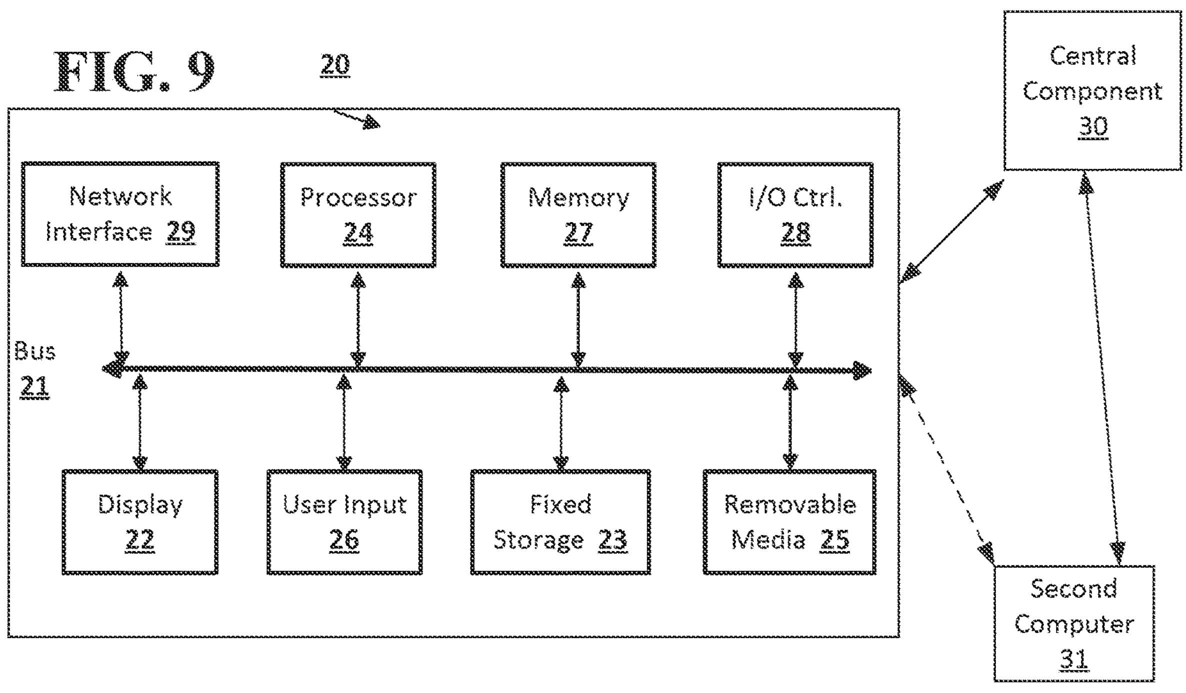
FIG. 9 shows a computer according to an implementation of the disclosed subject matter.

Implementations of the presently disclosed subject matter may be implemented in and used with a variety of component and network architectures. FIG. 9 is an example computer 20 suitable for implementing implementations of the presently disclosed subject matter. As discussed in further detail herein, the computer 20 may be a single computer in a network of multiple computers. As shown in FIG. 9, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 10.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

Figure 10:
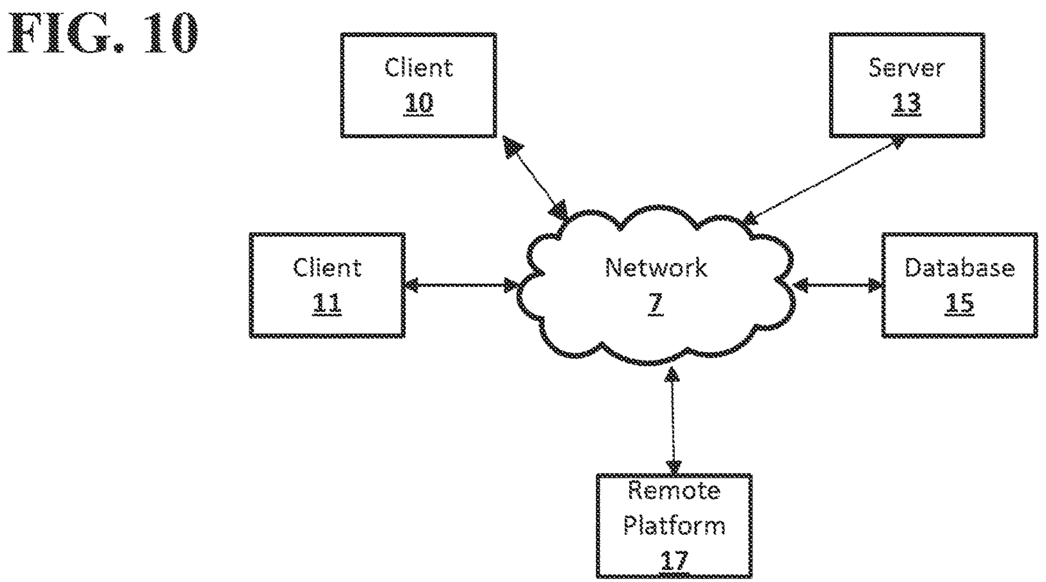
FIG. 10 shows a network configuration according to an implementation of the disclosed subject matter.

FIG. 10 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:

performing, by a monolithic management system, at least a first task on a first level of a cloud computing server system, wherein the first level of the cloud computing server system comprises two or more regions into which the physical computational resources of the cloud computing server system are divided and wherein the first task comprises configuration of one of the two or more regions;

performing, by the monolithic management system, at least a second task on a second level of a cloud computing server system, wherein the second level of the cloud computing system comprises instances into which regions of the two or more regions are divided, wherein the second task comprises configuration of one of the instances wherein the one of the instances is an instance of the one of the two or more regions configured by the first task;

invoking, by the monolithic management system, one or more instances of a container manager on a level of the cloud computing server system below the second level, wherein the one or more instances of the container manager are in the one of the instances that is configured by the second task and is an instance of the of the one of the two or more regions configured by the first task; and updating, with the one or more instances of the container manager, one or more container clusters of the cloud computing server system that are in the one of the instances that is configured by the second task by updating containerized applications within the one or more container clusters, updating settings and configuration of the one or more container clusters, or adding or removing containerized applications from the one or more container clusters, wherein the one or more instances of the container manager are each associated with separate container clusters of the one or more container clusters and the one or more instances of the container manager update their associated container clusters.

2. The computer-implemented method of claim 1, further comprising:

adding one or more additional container clusters to the cloud computing server system; and adding one or more additional instances of the container manager to the cloud computing server system, wherein the one or more additional instances of the container manager are associated with the one or more additional container clusters.

3. The computer-implemented method of claim 2, wherein invoking, by the monolithic management system, the one or more instances of the container manager on the level of the cloud computing server system below the second level further comprises invoking the one or more additional instances of the container manager.

4. The computer-implemented method of claim 2, wherein adding the one or more additional instances of the container manager further comprises replicating at least one of the one or more instances of the container manager.

5. The computer-implemented method of claim 1, wherein the one or more instances of the container manager update their associated container clusters by assuming security roles associated with accounts associated with their associated container clusters.

6. The computer-implemented method of claim 1, further comprising receiving, at one of the one or more instances of the container manager, a communication invoking the one of the one or more instances of the container manager from a computing device separate from any task of the monolithic management system.

7. The computer-implemented method of claim 1, wherein the monolithic management system comprises at least one pipeline comprising tasks to be performed by the monolithic management system on the cloud computing server system, and wherein one or more of the tasks of the pipeline comprise the invoking, by the monolithic management system, of the one or more instances of the container manager.

8. A computer-implemented system comprising:

a storage; and one or more processors that perform, with a monolithic management system, at least a first task on a first level of a cloud computing server system, wherein the first level of the cloud computing server system comprises two or more regions into which the physical computational resources of the cloud computing server system are divided and wherein the first task comprises configuration of one of the two or more regions, perform, with the monolithic management system, at least a second task on a second level of a cloud computing server system, wherein the second level of the cloud computing system comprises instances into which regions of the two or more regions are divided, wherein the second task comprises configuration of one of the instances wherein the one of the instances is an instance of the one of the two or more regions configured by the first task;

invoke, with the monolithic management system, one or more instances of a container manager on a level of the cloud computing server system below the second level, wherein the one or more instances of the container manager are in the one of the instances that is configured by the second task and is an instance of the of the one of the two or more regions configured by the first task, and update, with the one or more instances of the container manager, one or more container clusters of the cloud computing server system that are in the one of the instances that is configured by the second task by updating containerized applications within the one or more container clusters, updating settings and configuration of the one or more container clusters, or adding or removing containerized applications from the one or more container clusters, wherein the one or more instances of the container manager are each associated with separate container clusters of the one or more container clusters and the one or more instances of the container manager update their associated container clusters.

9. The computer-implemented system of claim 8, wherein the one or more processors further add one or more additional container clusters to the cloud computing server system, and add one or more additional instances of the container manager to the cloud computing server system, wherein the one or more additional instances of the container manager are associated with the one or more additional container clusters.

10. The computer-implemented system of claim 9, wherein the one or more processors further invoke the one or more additional instances of the container manager when the one or more processors invoke, with the monolithic management system, the one or more instances of the container manager on the level of the cloud computing server system below the second level.

11. The computer-implemented system of claim 9, wherein the one or more processors add the one or more additional instances of the container manager by replicating at least one of the one or more instances of the container manager.

12. The computer-implemented system of claim 8, wherein the one or more processors update, with the one or more instances of the container manager, the one or more of the container clusters associated with the one or more instances of the container manager by assuming, with the one or more instances of the container manager, security roles associated with accounts associated with the one or more of the container clusters.

13. The computer-implemented system of claim 8, wherein the one or more processors further receive, at one of the one or more instances of the container manager, a communication invoking the one of the one or more instances of the container manager from a computing device separate from any task of the monolithic management system.

14. The computer-implemented system of claim 8, wherein the monolithic management system comprises at least one pipeline comprising tasks to be performed by the monolithic management system on the cloud computing server system, and wherein one or more of the tasks of the pipeline comprise the invoking, by the monolithic management system, of the one or more instances of the container manager.

15. A system comprising: one or more computers and one or more non-transitory storage devices storing instructions which are operable, when executed by the one or more computers, to cause the one or more computers to perform operations comprising:

performing, by a monolithic management system, at least a first task on a first level of a cloud computing server system, wherein the first level of the cloud computing server system comprises two or more regions into which the physical computational resources of the cloud computing server system are divided and wherein the first task comprises configuration of one of the two or more regions;

performing, by the monolithic management system, at least a second task on a second level of a cloud computing server system, wherein the second level of the cloud computing system comprises instances into which regions of the two or more regions are divided, wherein the second task comprises configuration of one of the instances wherein the one of the instances is an instance of the one of the two or more regions configured by the first task;

invoking, by the monolithic management system, one or more instances of a container manager on a level of the cloud computing server system below the second level, wherein the one or more instances of the container manager are in the one of the instances that is configured by the second task and is an instance of the of the one of the two or more regions configured by the first task; and updating, with the one or more instances of the container manager, one or more container clusters of the cloud computing server system that are in the one of the instances that is configured by the second task by updating containerized applications within the one or more container clusters, updating settings and configuration of the one or more container clusters, or adding or removing containerized applications from the one or more container clusters, wherein the one or more instances of the container manager are each associated with separate container clusters of the one or more container clusters and the one or more instances of the container manager update their associated container clusters.

16. The system of claim 15, wherein the one or more computers and one or more non-transitory storage devices further store instructions which are operable, when executed by the one or more computers, to cause the one or more computers to further perform operations comprising:

when invoking, by the monolithic management system, the one or more instances of the container manager on the level of the cloud computing server system below the second level further comprises invoking the one or more additional instances of the container manager.

17. The system of claim 16 wherein the one or more computers and one or more non-transitory storage devices further store instructions which are operable, when executed by the one or more computers, to cause the one or more computers to further perform operations comprising:

invoking the one or more additional instances of the container manager when invoking, by the monolithic management system, the one or more instances of the container manager on the level of the cloud computing server system below the second level.

18. The system of claim 16, wherein the one or more computers and one or more non-transitory storage devices further store instructions which are operable, when executed by the one or more computers, to cause the one or more computers to further perform operations comprising:

replicating at least one of the one or more instances of the container manager when adding the one or more additional instances of the container manager.

19. The system of claim 15, wherein the one or more computers and one or more non-transitory storage devices further store instructions which are operable, when executed by the one or more computers, to cause the one or more computers to further perform operations comprising:

assuming, by the one or more instances of the container manager, security roles associated with accounts associated with their associated container clusters when the one or more instances of the container manager update their associated container clusters.

20. The system of claim 15, wherein the one or more computers and one or more non-transitory storage devices further store instructions which are operable, when executed by the one or more computers, to cause the one or more computers to further perform operations comprising:

receiving, at one of the one or more instances of the container manager, a communication invoking the one of the one or more instances of the container manager from a computing device separate from any task of the monolithic management system.

* * * * *